US008436065B2

(12) United States Patent
Hwang et al.

(10) Patent No.: US 8,436,065 B2
(45) Date of Patent: May 7, 2013

(54) AEROGEL, AND COMPOSITION AND METHOD FOR MANUFACTURE OF THE AEROGEL

(75) Inventors: Sung-Woo Hwang, Yongin-si (KR);
Myung-Dong Cho, Hwaseong-si (KR);
Sang-Ho Park, Yongin-si (KR);
Kwang-Hee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 208 days.

(21) Appl. No.: 12/891,143

(22) Filed: Sep. 27, 2010

(65) Prior Publication Data

US 2011/0245362 A1    Oct. 6, 2011

(30) Foreign Application Priority Data

Apr. 1, 2010 (KR) .......................... 10-2010-0030136

(51) Int. Cl.
*C08J 9/30* (2006.01)
*C08G 73/06* (2006.01)

(52) U.S. Cl.
USPC ............ 521/180; 521/181; 521/187; 516/104

(58) Field of Classification Search .................. 521/181, 521/180
See application file for complete search history.

(56) References Cited

U.S. PATENT DOCUMENTS

| 3,549,481 A | 12/1970 | Cesare et al. |
| 4,873,218 A | 10/1989 | Pekala |
| 4,966,919 A | 10/1990 | Williams, Jr. et al. |
| 4,997,804 A | 3/1991 | Pekala |
| 5,124,364 A | 6/1992 | Wolff et al. |
| 5,137,927 A | 8/1992 | Wolff et al. |
| 5,159,049 A | 10/1992 | Allen |
| 5,389,288 A | 2/1995 | Rindo et al. |
| 5,420,168 A | 5/1995 | Mayer et al. |
| 5,484,818 A | 1/1996 | De Vos et al. |
| 5,508,341 A | 4/1996 | Mayer et al. |
| 5,945,084 A | 8/1999 | Droege |
| 5,948,879 A | 9/1999 | Mori et al. |
| 5,990,184 A | 11/1999 | Biesmans |
| 6,040,375 A | 3/2000 | Behme et al. |
| 6,316,092 B1 | 11/2001 | Frank et al. |
| 6,887,563 B2 | 5/2005 | Frank et al. |
| 7,118,801 B2 | 10/2006 | Ristic-Lehmann et al. |

(Continued)

FOREIGN PATENT DOCUMENTS

| CN | 101525248 B | 7/2012 |
| DE | 1964188 A1 | 7/1970 |

(Continued)

OTHER PUBLICATIONS

Chaisuwan, T.; Komalwanich, T.; Luangsukrerk, S.; Wonkasemjit, S. "Removal of heavy metals from model wastewater by using polybenzoxazine aerogel" Desalination, 256 (2010) pp. 108-114. Available online Feb. 26, 2010.*

(Continued)

*Primary Examiner* — Randy Gulakowski
*Assistant Examiner* — Christina Wales
(74) *Attorney, Agent, or Firm* — Cantor Colburn LLP (57) ABSTRACT

An aerogel including a benzoxazine moiety-containing polybenzoxazine polymer is provided, wherein the aerogel comprises a reaction product of an aryl alcohol compound having at least two hydroxyl groups and an amine compound having at least two amine groups.

11 Claims, 6 Drawing Sheets

U.S. PATENT DOCUMENTS

| | | | |
|---|---|---|---|
| 7,282,466 | B2 | 10/2007 | Long et al. |
| 7,316,919 | B2 | 1/2008 | Childs et al. |
| 2001/0038933 | A1 | 11/2001 | Gebhardt et al. |
| 2002/0173554 | A1 | 11/2002 | Baumann et al. |
| 2004/0142149 | A1 | 7/2004 | Mollendorf et al. |
| 2005/0131089 | A1 | 6/2005 | Kocon et al. |
| 2007/0036959 | A1 | 2/2007 | Yamato et al. |
| 2007/0087120 | A1 | 4/2007 | Connors, Jr. et al. |
| 2007/0167534 | A1 | 7/2007 | Coronado et al. |
| 2007/0208124 | A1 | 9/2007 | Schiraldi et al. |
| 2007/0259169 | A1 | 11/2007 | Williams et al. |
| 2008/0087870 | A1 | 4/2008 | Williams et al. |
| 2008/0112876 | A1 | 5/2008 | Dailey |
| 2008/0188581 | A1 | 8/2008 | Lee et al. |
| 2008/0220333 | A1 | 9/2008 | Yano et al. |
| 2008/0287561 | A1 | 11/2008 | Menashi et al. |
| 2009/0029147 | A1 | 1/2009 | Tang et al. |
| 2009/0035344 | A1 | 2/2009 | Thomas et al. |
| 2010/0204347 | A1 | 8/2010 | Park et al. |
| 2010/0210810 | A1* | 8/2010 | Katagiri et al. ............... 528/137 |
| 2011/0201713 | A1 | 8/2011 | Kim et al. |
| 2011/0245361 | A1 | 10/2011 | Kim et al. |
| 2011/0311802 | A1 | 12/2011 | Cho et al. |

FOREIGN PATENT DOCUMENTS

| | | |
|---|---|---|
| EP | 0994912 A | 1/1994 |
| EP | 0995773 A2 | 4/2000 |
| JP | 4732742 A | 11/1972 |
| JP | 05-319899 A | 12/1993 |
| JP | 2000-119433 A | 4/2000 |
| JP | 2008132676 A | 6/2008 |
| JP | 2008221385 A | 9/2008 |
| JP | 2008231258 A | 10/2008 |
| KR | 19967003975 A | 8/1996 |
| KR | 1019990044531 A | 6/1999 |
| KR | 10-0282964 B1 | 12/2000 |
| KR | 1020010017538 A | 3/2001 |
| KR | 1020040011915 A | 2/2004 |
| KR | 1020040106289 A | 12/2004 |
| KR | 1020050037557 A | 4/2005 |
| KR | 1020050073500 A | 7/2005 |
| KR | 1020050118119 A | 12/2005 |
| KR | 10-2006-0099514 A | 9/2006 |
| KR | 10-0666110 B1 | 1/2007 |
| KR | 1020090059321 A | 6/2009 |
| KR | 1020090061301 A | 6/2009 |
| KR | 10-0911845 B | 8/2009 |
| WO | 96/26915 A1 | 9/1996 |
| WO | 2008104491 A1 | 9/2008 |
| WO | 2008114524 A1 | 9/2008 |
| WO | 2009033070 A1 | 3/2009 |

OTHER PUBLICATIONS

Katanyoota, P.; Chaisuwan, T.; Wongchaisuwat, A.; Wongkasemjit, S. "Novel polybenzoxazine-based carbon aerogel electrode for supercapacitors" Materials Science and Engineering B, 167 (2010) pp. 36-42. Available online Jan. 26, 2010.*

Komalwanich, T.; Chaisuwan, T; Wongkasemjit, S. "Removal of Heavy Metals from Wastewater by Polybenzoxazine-based Aerogel" PMSE Preprints 100 (2009) pp. 217-218. Presented Mar. 22-26, 2009.*

Chaisuwan, T.; Lorjai, P.; Wongkasemjit, S. "Novel carbon aerogel prepared from benzoxazine precursors via ambient drying: effect of amine derivatives" PMSE Preprints 100 (2009) pp. 322-323. Presented Mar. 22-26, 2009.*

Yang, J.; Li, S.; Yan, L.; Liu, J.; Wang, F. "Compressive behaviors and morphological changes of resorcinol-formaldehyde aerogel at high strain rates" Microporous and Mesoporous Materials 133 (2010) pp. 134-140.*

Capadona, L. A. et al., Flexible, Low-Density Polymer Crosslinked Silica Aerogels. Polymer, 2006; vol. 47: 5754-5761.

Hüsing, N. et al., Airy Materials: Chemistry, Structure, and Properties, Angew Chem. Int. Ed. 1998, 37: 23-45.

Kanamori, K. et al., New Transparent Methylsilsesquioxane Aerogels and Xerogels with Improved Mechanical Properties, Advanced Materials, 2007, vol. 19(12): 1589-1593.

Katanyoota, P. et al., Novel polybenzoxazine-based carbon aerogel electrode for supercapacitors, Materials Science and Engineering: B, 2010, vol. 167(1): 36-42.

Leventis, N. et al., Nanoengineering Strong Silica Aerogels, Nano Letters, 2002, vol. 2 (9): 957-960.

Lorjai, P, et al., Porous structure of polybenzoxazine-based organic aerogel prepared by solgel process and their carbon aerogels, J. of Sol-Gel Science and Technology, 1992, vol. 52 (1): 56-64.

Tan, C. et al., Organic Aerogels with Very High Impact Strength, Advanced Materials, 2001, vol. 13(9): 644-646.

EP Extended Search Report for Application No. 10191930.6-2102 dated May 11, 2011.

European Extended Search Report—EP 10191930.6 dated May 11, 2011.

Aaltonen, O. et al., The preparation of lignocellulosic aerogels from ionic liquid solutions, Carbohydrate Polymers, 2009, vol. 75: 125-129.

Al-Muhtaseb, S.A. et al., Preparation and Properties of Resorcinol-Formaldehyde Organic and Carbon Gels, Advanced Materials, 15,101-114 (2003).

Aoki, H. et al., Basic Study of the Gelation of Dimethacrylate-Type Crosslinking Agents, J. of Polymer Sci Part A: Polymer Chem, 2006, 44: 949-958.

Chowdhury, R., Electron-Beam-Induced Crosslinking of Natural Rubber/Acrylonitrile•Butadiene Rubber Latex Blends in the Presence of Ethoxylated Pantaerythritol Tetraacrylate Used as a Crosslinking Promoter, J. of Applied Polymer Sci, 2007, vol. 103 (2):1206-1214.

EP Extended Search Report for Application No. 11170821.0 dated Nov. 30, 2011.

EP Search Report for Application No. 11158144.3 dated Jul. 29, 2011.

Feldmann C., "Polyol-Medicated Synthesis of Nanoscale Functional Materials", Advanced Functional Materials, 2003, vol. 13(2): 101-107.

Fischer, F. et al., Cellulose-based aerogels, Polymer, 2006, vol. 47: 7636-7645.

Gavillon, R. et al., Aerocellulose: New Highly Porous Cellulose Prepared from Cellulose—NaOH Aqueous Solutions, Biomacromolecules, 2008, vol. 9: 269-277.

Gu, W. et al., Polymerized Gels and 'Reverse Aerogels' from Methyl Methacrylate or Styrene and Tetraoctadecylammonium Bromide as Gelator, Chem. Commun. 1997, 6, pp. 543-544.

Hebb, A. et al., Synthesis of porous cross-linked polymer monoliths using 1,1,1,2-tetrafluoroethane (R134a) as the porogen, Composites Science and Technology, 2003, vol. 63: 2379-2387.

Hoepfner, S. et al., Synthesis and characterisation of nanofibrillar cellulose aerogels, Cellulose, 2008, vol. 15: 121-129.

Iler, R.K.,1978. "The Chemistry of Silica", John Wiley & Sons, New York.

Innerlohinger, J. et al., Aerocellulose: Aerogels and Aerogel-like Materials made from Cellulose, Macromol. Symp., 2006, vol. 244: 126-135.

Jin, H. et al., Nanofibrillar cellulose aerogels, Colloids and Surfaces A: Physicochem. Eng. Aspects, 2004, vol. 240 (1-3): 63-67.

Jirglova, H. et al., Synthesis and Properties of Phloroglucinol-Phenol-Formaldehyde Carbon Aerogels and Xerogels, Langmuir, 2009; 25(4): 2461-2466.

Kaczmarek, H. et al., Networks of Photocrosslinked Poly(meth)acrylates in Linear Poly(vinyl chloride), Networks of , J. Appl. Polym. Sci., 2002, 86, 375-3734.

Leventis, N., Three-Dimensional Core-Shell Superstructures: Mechanically Strong Aerogels, Acc. Chem. Res. 2007, 2007, 40 (9): 874-884.

Liebner, F. et al., Cellulose aerogels: highly porous, ultra-lightweight materials, Holzforschung, 2008, vol. 62: 129-135.

Liebner, F. et al., Cellulosic aerogels as ultra-lightweight materials. Part 2: synthesis and properties, Holzforschung, 2009, vol. 63: 3-11.

Long, D. et al. "Molecular design of polymer precursors for controlling microstructure of organic and carbon aerogels", Journal of Non-Crystalline Solids, 2009,: vol. 355(22-23): 1252-1258.

Mulik, S. et al, Cross-Linking 3D Assemblies of Nanoparticles into Mechanically Strong Aerogels by Surface-Initiated Free-Radical Polymerization, Chem. Mater., 2008, 20 (15): 5035-5046.

Mulik, S. et al., Time-Efficient Acid-Catalyzed Synthesis of Resorcinol-Formaldehyde Aerogels, Chem. Mater., 2007, 19, pp. 5138-6144.

Paguio, R.R. et al., Fabrication Capabilities for Spherical Foam Targets Used in ICF Experiments,17th Target Fabrication Specialist Meeting, San Diego, CA, Oct. 1-5, 2006. Also published on IEEE Xplore.

Pekala, R. W. et al., "Structure of organic aerogels 1. Morphology and scaling", Macromolecules 26 (1993): 5487-5493.

Pekala, R.W. "Organic aerogels from the polycondensation of resorcinol with formaldehyde", Journal of Materials Science, 1989, 24(9): 3221-3227.

Rozenberg, B.A. et al., "High-performance Bismaleimide Matrices: Cure Kinetics and Mechanism" Polymers for Advanced Technologies, 2002, vol. 13 (10-12): 837-844.

Science Magazine, Editor's Choice Section, "Materials Science Spongy Clay?", Oct. 21, 2005, vol. 310; 5747: 407c.

Tan, C. et al., Organic Aerogels with Very High Impact Strength, Advanced Materials, 2001, vol. 13 (9): 644-646.

Wiener, M. et al., "Carbon Aerogel-Based High-Temperature Thermal Insulation", Int J. Thermophys, 2009, vol. 30 (4):1372-1385.

* cited by examiner

AEROGEL, AND COMPOSITION AND METHOD FOR MANUFACTURE OF THE AEROGEL

CROSS-REFERENCE TO RELATED APPLICATION

This application claims priority to Korean Patent Application No. 10-2010-0030136 filed on Apr. 1, 2010, and all the benefits accruing therefrom under 35 U.S.C. §119, the content of which in its entirety is herein incorporated by reference.

BACKGROUND

1. Field

This disclosure relates to an aerogel, a composition for manufacture of the aerogel, and a method of manufacturing the aerogel.

2. Description of the Related Art

An aerogel is a mesoporous material having a three-dimensional mesh structure with nanometer scale pores. Aerogels typically exhibit adiabatic (insulating) and sound absorption properties, and may be used in a variety of applications. For example, aerogels may be used in cooling devices such as a refrigerators and freezers, and as materials for the aerospace industry and building construction.

Aerogels may be classified as inorganic or organic according to the materials used to prepare the aerogel. An example of an inorganic aerogel is a silica aerogel. An organic aerogel includes an organic linking group, and thus is generally more flexible than an inorganic aerogel.

SUMMARY

An organic aerogel may have various properties, which vary according to its chemical structure and method of manufacture.

An embodiment of this disclosure provides an aerogel having improved properties.

Another embodiment of this disclosure provides an aerogel composition for use in the manufacture of an aerogel.

A further embodiment of this disclosure provides a method for manufacturing the aerogel.

According to an embodiment of this disclosure, an aerogel is provided, wherein the aerogel includes a benzoxazine moiety-containing polybenzoxazine polymer. In certain embodiments, the aerogel comprises a reaction product of an aryl alcohol compound having at least two hydroxyl groups and an amine compound having at least two amine groups. Such an aerogel may, for example, be prepared by polymerizing an aryl alcohol compound having at least two hydroxyl groups and an amine compound having at least two amine groups.

According to another embodiment, a composition for manufacturing the aerogel is provided, wherein the composition includes an aryl alcohol compound having at least two hydroxyl groups, an amine compound having at least two amine groups, an aldehyde compound, and a solvent.

According to yet another embodiment, a method of making the aerogel is provided, wherein the method includes:
reacting an aryl alcohol compound having at least two hydroxyl groups, an amine compound having at least two amine groups, and an aldehyde compound, in a solvent, to form a wet gel that includes a benzoxazine moiety-containing polybenzoxazine polymer, and
drying the wet gel to form an aerogel.

In further embodiments, the aryl alcohol compound having at least two hydroxyl groups is represented by the following Chemical Formula 1.

Chemical Formula 1

In the above Chemical Formula 1,
each $Ar_1$ and $Ar_2$ is independently a substituted or unsubstituted C6 to C30 aryl group, a substituted or unsubstituted C3 to C30 heteroaryl group, or a substituted or unsubstituted C7 to C30 alkylaryl group, such that each $Ar_1$ and $Ar_2$ includes at least one unsubstituted ring carbon (—CH—) at the alpha (α) position (ortho position) with respect to a hydroxyl (OH) group,
each $L_1$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group,
each R and R' is independently hydrogen or a substituted or unsubstituted C1 to C10 alkyl group,
r is an integer ranging from 0 to 4,
n and m are independently integers ranging from 1 to 5, and n+m is determined by the valence of $L_1$,
p and q are independently integers ranging from 1 to 4, and p+q is 2 or more provided that when $k_1$ is 0, p is 2, 3 or 4, and
$k_1$ is an integer ranging from 0 to 4.

Representative examples of a compound represented by the above Chemical Formula 1 include compounds represented by the following Chemical Formula 2.

Chemical Formula 2

In the above Chemical Formula 2,
each $L_1$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group,
each $R_1$ and $R_2$ is independently hydrogen, a hydroxyl group, a substituted or unsubstituted C1 to C10 alkyl group, a substituted or unsubstituted C1 to C10 alkoxy group, $NR_xR_y$, OR, $NH(CO)R_x$, $OCOR_x$, a substituted or C6 to C18 aryl group, or $CH=CR_x$, and each $R_x$ and $R_y$ is independently hydrogen or a substituted or unsubstituted C1 to C10 alkyl group,
p and q are independently integers ranging from 1 to 4, p+q is 2 or more, provided that when $k_1$ is 0, p is 2, 3 or 4,
a and b are independently integers ranging from 1 to 3, and
$k_1$ is an integer ranging from 0 to 4, In certain embodiments of the above Chemical Formula 2, at least one $R_1$ or $R_2$ is a substituted or unsubstituted C1 to C10 alkyl group, a substituted or unsubstituted C1 to C10 alkoxy group, $NR_xR_y$, OR, $NH(CO)R_x$, $OCOR_x$, a substituted or unsubstituted C6 to C18 aryl group, or $CH=CR_x$, wherein each $R_x$ and $R_y$ is independently hydrogen or a substituted or unsubstituted C1 to C10 alkyl group.

In further representative embodiments, each $L_1$ may be a linker represented by the following Chemical Formula 3.

Chemical Formula 3

In the above Chemical Formula 3, $R_3$ and $R_4$ are independently a substituted or unsubstituted C1 to C10 alkyl group, a substituted or unsubstituted C1 to C10 alkoxy group, a substituted or unsubstituted C3 to C20 cycloalkyl group, or a substituted or unsubstituted C6 to C18 aryl group. In certain embodiments, the alkyl, cycloalkyl, and aryl groups are substituted with at least one hydroxyl group.

In certain embodiments, the amine compound having at least two amine groups may be represented by the following Chemical Formula 4.

Chemical Formula 4

In the above Chemical Formula 4, each $Z_1$ and $Z_2$ is independently a substituted or unsubstituted C6 to C30 aryl group, a substituted or unsubstituted C3 to C30 heteroaryl group, a substituted or unsubstituted C7 to C30 alkylaryl group, or $NR_z$ (wherein $R_z$ is hydrogen, a C1 to C20 alkyl group, a C1 to C20 alkyl group having an amine substituent, or a C1 or C6 to C30 aryl group), each $L_2$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, n and m are independently integers ranging from 1 to 5, and n+m is determined by the valence of $L_2$, p and q are independently integers ranging from 1 to 4, each R, R', R", and R''' is independently hydrogen or a C1 to C10 alkyl group, r1 and r2 are independently integers ranging from 0 to 4, and $k_2$ is an integer ranging from 0 to 4.

In certain representative embodiments, the amine compound having at least two amine groups may be used in an amount ranging from about 1 mole to about 1.5 moles based on 1 mole of an aryl alcohol compound.

The aerogel typically has a pore size ranging from about 1 nm to 50 nm and a porosity ranging from about 80% to about 99% based on the total aerogel volume. In certain embodiments, the aerogel may have a specific surface area ranging from about 100 square meters per gram ($m^2$/g) to about 800 $m^2$/g. Within further embodiments, the aerogel has linear shrinkage of about 25% or less, or 20% or less, based on volume of a wet gel.

The aerogel has compressive strength ranging from about 0.1 MPa to 300 MPa in an embodiment, from 30 MPa to 300 MPa in another embodiment.

The solvent may, within certain representative embodiments, include an organic solvent, such as dimethyl formamide ("DMF"), acetone, 1,4-dioxane, tetrahydrofuran, dimethylsulfoxide, toluene, benzene, dichlorobenzene, acetonitrile, alcohol, or a combination comprising at least one of the foregoing.

The composition for manufacturing an aerogel may, but need not, further include a catalyst, such as an acid catalyst.

DETAILED DESCRIPTION

This disclosure will be described more fully hereinafter in the following detailed description of the invention, and with reference to the accompanying drawings, in which some but not all embodiments of the disclosure are described. This disclosure may, however, be embodied in many different forms and is not to be construed as limited to the exemplary embodiments set forth herein; rather, these embodiments are provided so that this disclosure will be thorough and complete, and will fully convey the scope of the invention to those skilled in the art. Like reference numerals and variables refer to like elements throughout.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements and/or components, but do not preclude the presence or addition of one or more other features, regions, integers, steps, operations, elements, components and/or groups thereof.

Unless otherwise defined, all terms (including technical and scientific terms) used herein have the same meaning as commonly understood by one of ordinary skill in the art to which this invention belongs.

As used herein, when a definition is not otherwise provided, "substituted" indicates replacement of one or more hydrogens (e.g., 1, 2, 3, 4, 5, or 6 hydrogens) in a compound with one or more substituents independently selected from a C1 to C30 alkyl group, a C2 to C30 alkenyl group, a C2 to C30 alkynyl group, a C6 to C30 aryl group, a C7 to C30 alkylaryl group, a C1 to C4 alkoxyl group, a C1 to C30 heteroalkyl group, a C3 to C30 heteroaryl group, a C3 to C30 cycloalkyl group, a C3 to C15 cycloalkenyl group, a C6 to C30 cycloalkynyl group, a C2 to C30 heterocycloalkyl group, halogen (F, Cl, Br, or I), a hydroxyl group, an alkoxy group, a nitro group, a cyano group, an amino group, an azido group, an amidino group, a hydrazine group, a hydrazono group, a carbonyl group, a carbamyl group, a thiol group, an ester group, a carboxyl group or a salt thereof, a sulfonic acid group or a salt thereof, and phosphoric acid or a salt thereof.

An "alkyl" group is a straight or branched chain saturated aliphatic hydrocarbon. Alkyl groups include, for example, groups having from 1 to 30 carbon atoms ("C1 to C30 alkyl"). "Alkenyl" is a straight or branched chain hydrocarbon that comprises at least one carbon-carbon double bond; and "alkynyl" refers to a straight or branched chain hydrocarbon that has one or more unsaturated carbon-carbon bonds, at least one of which is a triple bond.

A "cycloalkyl" group comprises one or more saturated rings in which all ring members are carbon, such as cyclopropyl, cyclobutyl, cyclopentyl, cyclohexyl, cycloheptyl, cyclooctyl, and adamantyl. Partially saturated variants of the foregoing are referred to herein as cycloalkenyl groups (which comprise at least one carbon-carbon double bond, such as cyclohexenyl) or cycloalkynyl groups (which comprise at least one carbon-carbon triple bond). Cycloalkyl, cycloalkenyl and cycloalkynyl groups do not comprise an aromatic ring or a heterocyclic ring. When numbers of carbon atoms are specified (e.g., C3-C15 cycloalkyl), such numbers refer to the number of ring members present in the one or more rings.

A "heteroalkyl" group is an alkyl group that comprises at least one heteroatom covalently bonded to one or more carbon atoms of the alkyl group. Each heteroatom is independently chosen from nitrogen (N), oxygen (O), sulfur (S), and phosphorus (P).

An "alkoxy" group is a type of heteroalkyl group, in particular an alkyl moiety that is linked via an oxygen (i.e., —O-alkyl). Nonlimiting examples of C1-C30 alkoxy groups include methoxy groups, ethoxy groups, propoxy groups, isobutyloxy groups, sec-butyloxy groups, pentyloxy groups, iso-amyloxy groups, and hexyloxy groups.

A "heterocycloalkyl" group is a monovalent group that comprises one or more rings, none of which is aromatic, and at least one of which comprises at least one heteroatom (e.g., one, two, or three heteroatoms) as a ring member. In a C2-C30 heterocycloalkyl group, the total number of carbon ring members ranges from 2 to 30, with remaining ring members independently chosen from nitrogen (N), oxygen (O), sulfur (S), and phosphorus (P).

A "C6-C30 aryl group" is a monovalent carbocyclic ring system that includes one or more aromatic rings, in which all ring members are carbon, and in which the total number of ring atoms ranges from 6 to 30. Multiple rings, if present, may be pendent, spiro or fused. Representative aryl groups include, for example, phenyl, naphthyl, and tetrahydronaphthyl groups.

An "alkylaryl" group is an aryl group linked via an alkylene moiety. The specified number of carbon atoms (e.g., C7 to C30) refers to the total number of carbon atoms present in both the aryl and the alkylene moieties. Representative alkylaryl groups include, for example, benzyl groups.

A "heteroaryl" group is a monovalent carbocyclic ring system that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are generally independently selected from nitrogen (N), oxygen (O), P (phosphorus), and sulfur (S).

Throughout the specification, reference is made to various bivalent moieties. Such moieties are the same as the monovalent groups that are similarly named, and are typically indicated with an "ene" suffix. For example, a C1 to C30 alkylene group is a bivalent linking group having the same structure as a C1 to C30 alkyl group, a C6 to C30 arylene group is a bivalent linking group having the same structure as a C6 to C30 aryl group, and a C1 to C30 heteroalkylene group is a bivalent linking group having the same structure as a C1 to C30 heteroalkyl group.

As used herein, an "aerogel" may include an ambigel, a xerogel, a cryogel, and the like.

Hereinafter, an aerogel according to one embodiment is illustrated.

According to one embodiment, an aerogel is an organic aerogel including a polymer having a plurality of mesopores.

The polymer is a benzoxazine moiety-containing polybenzoxazine polymer. Such a polymer generally comprises a reaction product of an aryl alcohol compound having at least two hydroxyl groups and an amine compound having at least two amine groups, and may be prepared by polymerizing an aryl alcohol compound having at least two hydroxyl groups and an amine compound having at least two amine groups. Since the polymer includes a benzoxazine moiety, it can improve flexibility and thermal conductivity of an aerogel.

In certain embodiments, the aryl alcohol compound having at least two hydroxyl groups is represented by the following Chemical Formula 1.

Chemical Formula 1

In the above Chemical Formula 1, each $Ar_1$ and $Ar_2$ are independently a substituted or unsubstituted C6 to C30 aryl group, a substituted or unsubstituted C3 to C30 heteroaryl group, or a substituted or unsubstituted C7 to C30 alkylaryl group, such that each $Ar_1$ and each $Ar_2$ includes at least one unsubstituted ring carbon (—CH—) at the alpha (α) position (ortho position) with respect to a hydroxyl (OH) group, each $L_1$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, each R and R' is independently hydrogen, or a substituted or unsubstituted C1 to C10 alkyl group, r is an integer ranging from 0 to 4, n and m are independently integers ranging from 1 to 5, and n+m is determined according to the valence of $L_1$, p and q are independently integers ranging from 1 to 4, and p+q is 2 or more provided that when $k_1$ is 0, p is 2, 3 or 4, and $k_1$ is an integer ranging from 0 to 4.

Nonlimiting examples of a compound represented by the above Chemical Formula 1 may include compounds represented by the following Chemical Formula 2.

Chemical Formula 2

In the above Chemical Formula 2, each $L_1$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, each $R_1$ and $R_2$ is independently hydrogen, a hydroxyl group, a substituted or unsubstituted C1 to C10 alkyl group, a substituted or unsubstituted C1 to C10 alkoxy group, $NR_xR_y$, OR, $NH(CO)R_x$, $OCOR_x$, a substituted or unsubstituted C6 to C18 aryl group, or $CH=CR_x$, wherein each $R_x$ and $R_y$ is independently hydrogen or a substituted or unsubstituted C1 to C10 alkyl group, p and q are independently integers ranging from 1 to 4, and p+q is 2 or more, provided that when $k_1$ is 0, p is 2, 3, or 4, a and b are independently integers ranging from 1 to 3, and

$k_1$ is an integer ranging from 0 to 4, such that at least one unsubstituted carbon (—CH—) is present at an alpha (α) position (ortho position) with respect to a hydroxyl (OH) group in each of the benzene rings of Chemical Formula 2.

In certain representative embodiments of the above Chemical Formula 2, at least one of $R_1$ and $R_2$ may be a substituted or unsubstituted C1 to C10 alkyl group, a substituted or unsubstituted C1 to C10 alkoxy group, $NR_xR_y$, $OR_x$, NH(CO)$R_x$, $OCOR_x$, a substituted or unsubstituted C6 to C18 aryl group, for example, a phenyl group, or $CH=CR_x$, wherein each $R_x$ and $R_y$ is independently hydrogen or a substituted or unsubstituted C1 to C10 alkyl group.

In further representative embodiments, $L_1$ may be a linker represented by the following Chemical Formula 3.

Chemical Formula 3

In the above Chemical Formula 3, $R_3$ and $R_4$ are independently a substituted or unsubstituted C1 to C10 alkyl group, a substituted or unsubstituted C1 to C10 alkoxy group, a substituted or unsubstituted C3 to C20 cycloalkyl group, or a substituted or unsubstituted C6 to C18 aryl group. In certain embodiments, the alkyl, cycloalkyl, and aryl groups are substituted with at least one hydroxyl group (e.g., 1, 2 or 3 hydroxyl groups).

Representative examples of the aryl alcohol compound may include, for example, phloroglucinol, 1,1,1-tris(4-hydroxyphenyl)ethane, α,α,α'-tris(2-hydroxyphenyl)-1-ethyl-4-isopropylbenzene, trihydroxynaphthalene, and the like.

In certain embodiments, the amine compound having at least two amine groups may be represented by the following Chemical Formula 4.

Chemical Formula 4

In the above Chemical Formula 4, each $Z_1$ and $Z_2$ is independently a substituted or unsubstituted C6 to C30 aryl group, a substituted or unsubstituted C3 to C30 heteroaryl group, a substituted or unsubstituted C7 to C30 alkylaryl group, or $NR_z$ (wherein $R_z$ is hydrogen, a C1 to C20 alkyl group, a C1 to C20 alkyl group having an amine substituent, or a C6 to C30 aryl group).

each $L_2$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, n and m are independently integers ranging from 1 to 5, and n+m is determined by the valence of $L_2$, p and q are independently integers ranging from 1 to 4, each R, R', R", and R'" is independently hydrogen or a C1 to C10 alkyl group, r1 and r2 are independently integers ranging from 0 to 4, and $k_2$ is an integer ranging from 0 to 4.

In certain representative embodiments, the amine compound having at least two amine groups may is represented by one of the following Chemical Formulae A.

Chemical Formulae A

DAN  TAEA  TETA

In certain representative embodiments, the amount of amine compound having at least two amine groups during polymerization may range from about 1 mole to about 1.5 moles per mole of aryl alcohol compound. When the amount is to within this range, a benzoxazine moiety-containing benzoxazine polymer can be readily prepared by reacting at least one hydrogen at the alpha (α) position (ortho position) relative to an OH group of an aryl alcohol compound with an amine group and forming a benzoxazine cycle. The benzoxazine moiety allows the formation of an aerogel having desirable thermal conductivity and flexibility.

The aldehyde compound may, within certain representative embodiments, be selected from formaldehyde, acetaldehyde, propionaldehyde, butyraldehyde, benzaldehyde, furaldehyde glutaraldehyde, or a combination comprising at least one of the foregoing.

The amount of aldehyde compound may be, for example, about 1 mole to about 12 moles per mole of an aryl alcohol compound. When the amount of aldehyde is within this range, the resulting aerogel can exhibit excellent mechanical properties and insulation characteristics.

The aryl alcohol compound having at least two hydroxyl groups, the amine compound having at least two amine groups, and the aldehyde compound undergo a cyclization reaction to form a benzoxazine moiety-containing benzoxazine polymer. For example, a polymer represented by the following Chemical Formula 5 is prepared using 1,3,5-trihydroxybenzene ("THB") as the aryl alcohol compound having at least two hydroxyl groups, and diaminophenylmethane ("MDA") as the amine compound having at least two amine groups.

Chemical Formula 5

A benzoxazine moiety-containing benzoxazine polymer represented by the above Chemical Formula 5 exhibits excellent mechanical strength, and can provide an aerogel having excellent flexibility.

The aerogel has many pores ranging from about 1 nm to 50 nm in diameter, and a porosity ranging from about 80 to about 99% based on the total volume of the aerogel. The aerogel can have a high specific surface area due to the fine-sized pores and high porosity. In certain embodiments, the specific surface area ranges from about 100 $m^2/g$ to about 800 $m^2/g$; in further embodiments, the specific surface area ranges from 300 $m^2/g$ to 500 $m^2/g$. The above pore size, porosity, and specific surface area ranges result in an aerogel with excellent insulation and sound absorption properties. In addition, density can be easily controlled; for example, the density may range from about 0.1 $g/cm^3$ to about 0.3 $g/cm^3$.

In certain embodiments, the aerogel can have compressive strength ranging from about 0.1 MPa to 300 MPa; in further embodiments, the compressive strength may range from 30 MPa to 300 MPa; and in still further embodiments, the compressive strength may range from about 100 MPa to 300 MPa. Herein, the compressive strength is measured according to the ASTM D695-02a standard. The above compressive strength indicates that the aerogel exhibits excellent flexibility.

The aerogel may be fabricated by drying a wet gel prepared by polymerizing monomers, resulting in a microstructure forming branch-shaped clusters from a plurality of pores, and high structural strength and flexibility. Due to the high structural strength and flexibility, the pores do not collapse during the preparation process, allowing the formation of a predetermined pore size and an aerogel with a high specific surface area and adiabatic properties.

Hereinafter, a representative method of preparing the above aerogel is described.

The aerogel is prepared as a wet gel by polymerizing a composition for manufacturing an aerogel.

The composition for manufacturing an aerogel may be a solution prepared by mixing an aryl alcohol compound having at least three hydroxyl groups, an amine compound having at least two amine groups, and an aldehyde compound in a solvent.

The aryl alcohol compound, amine compound, and aldehyde compound are generally as described above.

The composition for manufacturing an aerogel may optionally include a catalyst. The catalyst may, within certain embodiments, be an acid catalyst such as hydrochloric acid (HCl), hydrogen bromide (HBr), sulfuric acid ($H_2SO_4$), acetic acid, p-toluenesulfonic acid, trifluoroacetic acid, or the like; a base catalyst such as sodium hydroxide (NaOH), sodium hydrogen carbonate ($NaHCO_3$), potassium hydroxide (KOH), potassium hydrogen carbonate ($KHCO_3$), ammonium hydroxide ($NH_4OH$), an amine compound, or the like; or a combination comprising at least one of the foregoing. In certain embodiments, the catalyst is an acid catalyst. In further embodiments, the catalyst may be used in an amount ranging from about 0.001 moles to about 0.1 moles, based on 100 moles of monomer.

In certain embodiments, the solvent may be an organic solvent, such as dimethyl formamide, acetone, 1,4-dioxane, tetrahydrofuran, dimethylsulfoxide, toluene, benzene, dichlorobenzene, acetonitrile, alcohol (e.g., ethanol, methanol, isopropanol, or the like), or a combination comprising at least one of the foregoing.

It will be apparent that the solvent can be chosen based on the target density of an aerogel.

The composition for manufacturing an aerogel is used to form a benzoxazine cycle of an aryl alcohol compound and an amine compound, and then to form a polymer including a benzoxazine moiety, preparing an aerogel through sol-gel reaction.

The wet gel may undergo a solvent exchange reaction. The solvent may include any solvent having good liquid compatibility with carbon dioxide, without limitation. For example, acetone, 1,4-dioxane, tetrahydrofuran, ethanol, methanol, isopropanol, and the like may be used. However, when the wet gel is dried under atmospheric pressure or the solvent used during preparation of the wet gel has sufficient compatibility with carbon dioxide, any solvent exchange process may be omitted.

Subsequently, the wet gel is dried. The drying is performed, for example, by supercritical drying, atmospheric pressure drying, lyophilizing (i.e., reduced pressure drying), or a combination thereof.

Supercritical drying uses supercritical carbon dioxide. First, liquid carbon dioxide is supplied to a high-pressure reactor to remove solvent in a wet gel. Then, the temperature and pressure of the high-pressure reactor are raised over the threshold point of carbon dioxide, and the carbon dioxide is slowly ejected (e.g., vented) under reduced pressure for removal. The supercritical drying may be performed at room temperature (e.g., at about 20° C. to about 25° C.), and has good processability and safety.

Atmospheric pressure drying involves drying a wet gel by heating the wet gel under atmospheric pressure. When the solvent is removed in the atmospheric pressure drying method, the resultant product is called xerogel, which is a type of aerogel.

Lyophilizing is a method of removing solvent by freezing the wet gel including a solvent (e.g., an aqueous solution) and reducing the pressure to sublimate frozen solvent (e.g., ice). When the solvent is removed by lyophilizing, the resultant product is called a cryogel, which is a type of aerogel.

The aerogel according to a representative embodiment undergoes negligible shrinkage during the solvent exchange and drying processes and maintains pores after the drying.

Since the aerogel has excellent adiabatic and sound absorption properties, it may be used in a variety of applications, including within a cooling device such as a refrigerator or a freezer, in cryogenic storage such as for liquid natural gas (LNG), and in freight vessels, and may be used as an adiabatic material for the aerospace industry, in piping, buildings, and construction, as an adiabatic fabric for clothing and shoes, as a catalyst carrier, and as a sound absorption material or a vibration reduction material. Also, through pyrolysis, the aerogel may be converted to a carbon aerogel and used as an electrode material.

Hereinafter, this disclosure is illustrated in more detail with reference to examples. However, they are exemplary embodiments of this disclosure and are not limiting.

Preparation of Aerogel

Examples 1 to 3

0.126 g of 1,3,5-trihydroxybenzene ("THB") and 0.297 g of diaminophenylmethane ("MDA") are dissolved with 4.23 mL of an N,N'-dimethyl formamide ("DMF") solvent in a cylindrical polypropylene vial, and then 0.487 g of a 37 wt % formaldehyde aqueous solution (formalin, 37 wt % of HCHO in $H_2O$; "aF") is added thereto. The mixture is actively agitated at room temperature for one minute. The reactants, THB:MDA:aF are used at a mole ratio of 1:1.5:6. Next, the mixture is slowly heated to about 60° C. for about 10 minutes. In order to acquire a desired density, the reactants are respectively controlled to have a solid concentration of 5 wt %, 7.5 wt %, and 12 wt %. Next, formation of a gel is identified by fluidity on the interface and the gel is matured at room temperature of 25° C.

The prepared wet gel is exchanged with acetone, a solvent having good compatibility with liquid carbon dioxide. Then, the liquid carbon dioxide is added to the wet gel in a high pressure reactor to remove the acetone from the wet gel. When the acetone inside the wet gel is removed, a monolith-type aerogel is prepared by increasing the temperature and pressure beyond the threshold temperature of carbon dioxide and then slowly removing the carbon dioxide at the same temperature to reduce the pressure.

Example 4

An aerogel is prepared according to the same method as Example 1 except for controlling the solid concentration to have the target density provided in the following Table 2.

Example 5

An aerogel is prepared according to the same method as Example 1 except for using p-phenylenediamine ("PDA") instead of 4,4'-diaminophenyl methane and controlling its solid concentration to have the target density provided in Table 2, below.

Example 6

An aerogel is prepared according to the same method as Example 1 except for using oxydianiline ("ODA") instead of 4,4'-diaminophenyl methane and controlling its solid concentration to have the target density provided in Table 2.

Example 7

An aerogel is prepared according to the same method as Example 1 except for using p-xylenediamine ("XDA") instead of 4,4'-diaminophenyl methane and controlling its solid concentration to have the target density provided in Table 2.

Example 8

An aerogel is prepared according to the same method as Example 1 except for using 1,4'-bis(4-amine-phenoxy)benzene ("BAPB") instead of 4,4'-diaminophenyl methane.

Example 9

Representative Aerogel Properties

The representative aerogels according to Examples 1 to 3 are evaluated to determine density, specific surface area, total pore volume, and average pore size. The results are provided in the following Table 1. The average pore size and total pore volume are calculated using a BJH absorption-desorption isotherm. The specific surface area is measured using a specific surface analyzer, ASAP 2010 (Micromeritics Instruments, USA), at 77K.

TABLE 1

|  | Solid (wt %) | Density (g/cm$^3$) | Specific surface area (m$^2$/g) | Total pore volume (cm$^3$/g) | Average pore size (nm) |
| --- | --- | --- | --- | --- | --- |
| Example 1 | 5 | 0.13 | 233.12 | 1.5366 | 24.34 |
| Example 2 | 7.5 | 0.21 | 144.53 | 0.4601 | 11.91 |
| Example 3 | 12 | 0.49 | 103.77 | 0.2947 | 10.46 |

As shown in Table 1, the representative aerogels according to Examples 1 to 3 exhibited various densities, specific surface areas, pore volumes, and pore sizes as a result of varying the solid concentration.

Figure 1:
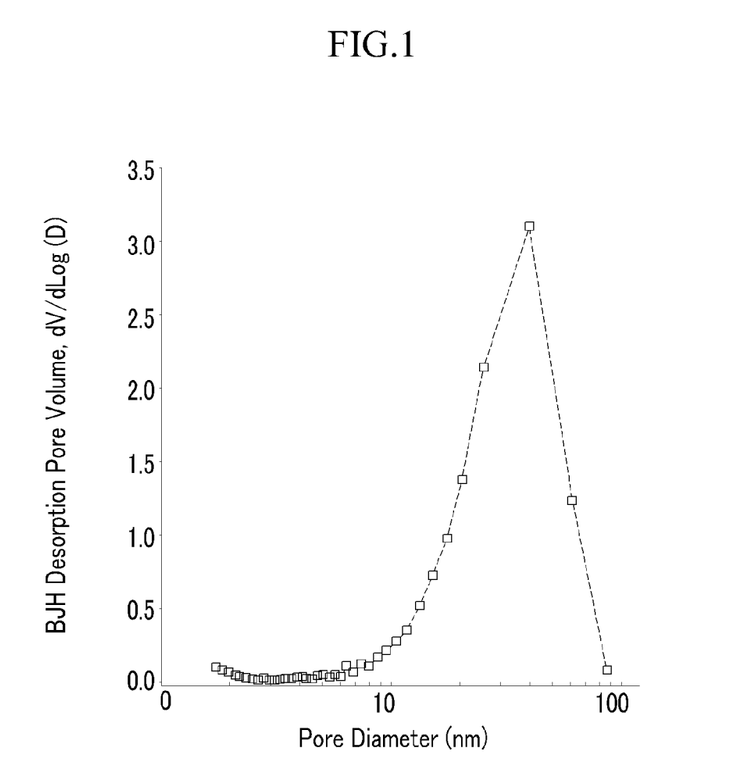
FIG. 1 is a graph of Barrett-Joyner-Halenda ("BJH") desorption pore volume (dV/dLog (D)) vs pore diameter (nm), showing the pore size distribution of a representative aerogel according to Example 1.

FIG. 1 provides a graph showing pore size distribution of the representative aerogel according to Example 1. Referring to FIG. 1, the aerogel prepared according to Example 1 exhibits a uniform pore size. This indicates that the pores are not destroyed, but rather are maintained in the solvent exchange and drying steps.

Figure 2:
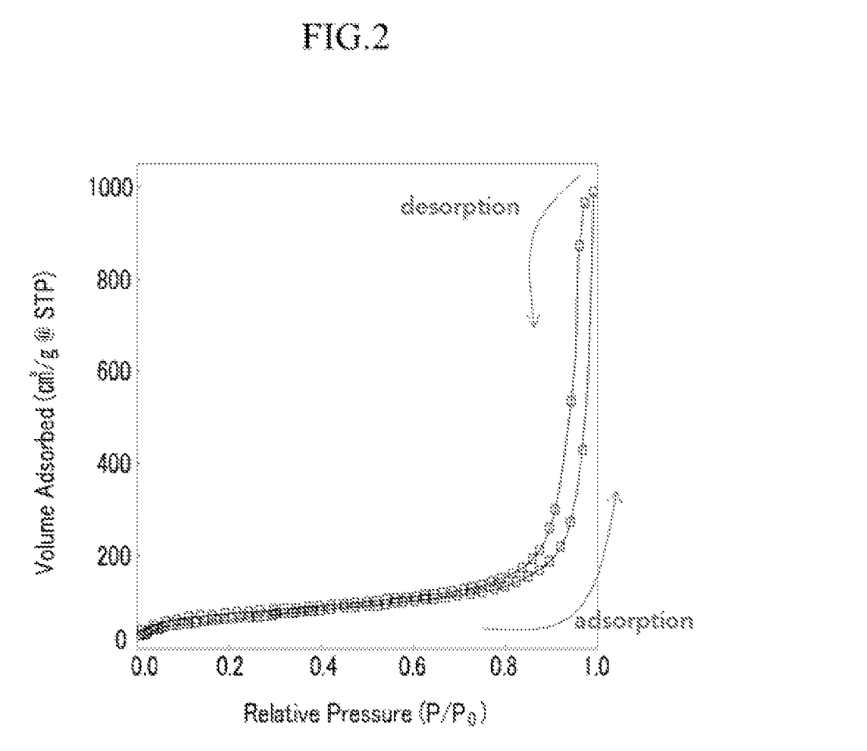
FIG. 2 is a graph of volume adsorbed ($cm^3$/g at standard temperature and pressure) vs. relative pressure ($P/P_0$), showing a nitrogen ($N_2$) adsorption-desorption isotherm of a representative aerogel according to Example 1. The analysis was performed twice, with both isotherms shown.

FIG. 2 provides a graph showing duplicate nitrogen (N$_2$) adsorption-desorption isotherms of the representative aerogel according to Example 1. Referring to FIG. 2, the nitrogen adsorption or desorption amount varies depending on pressure, which is indicative of an organic aerogel having fine pores.

Figure 3A:
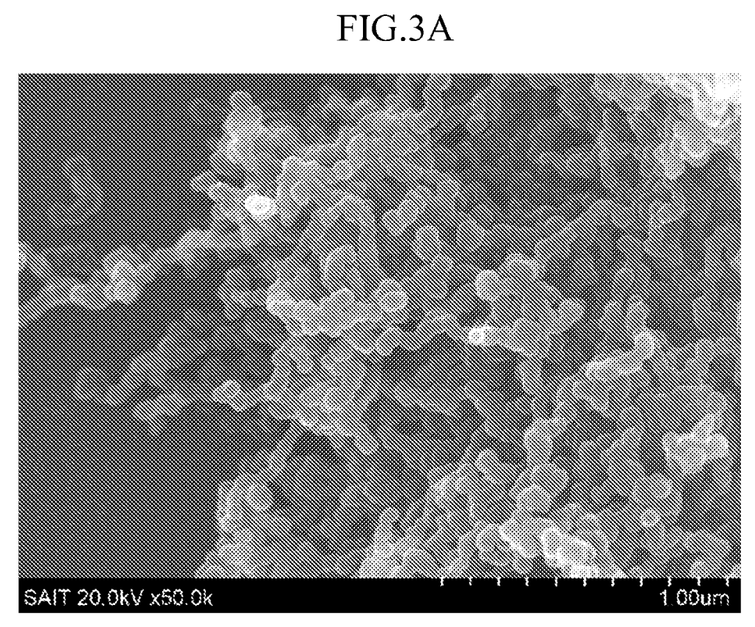
FIGS. 3A and 3B are scanning electron microscope (SEM) photographs of a representative aerogel according to Example 1.
Figure 3B:
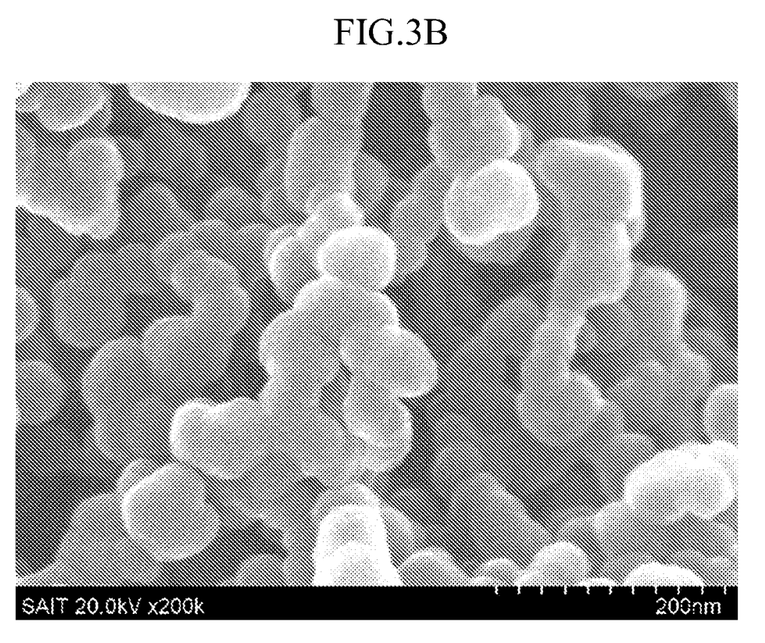

FIGS. 3A and 3B are photographs of the representative aerogel according to Example 1 taken using a scanning electron microscope (SEM) at ×50,000 and ×200,000 magnification, respectively. As shown in FIGS. 3A and 3B, the aerogel according to Example 1 has a plurality of fine pores (black regions).

The representative aerogels according to Examples 4 to 8 are evaluated for specific surface area, average pore size, and linear shrinkage. The results are provided in Table 2.

The average pore size (BJH desorption average pore diameter, 4 V/A) is calculated using a BJH adsorption-desorption isotherm, and the specific surface area is measured at 77K using a specific surface analyzer, ASAP 2020 (Micromeritics Instruments, USA). The linear shrinkage may be calculated from the change in diameter of the aerogel after supercritical drying, relative to the diameter of a wet gel.

TABLE 2

|  | Amine compound | Target density g/m$^3$ | Average pore size (nm) | Specific surface area (m$^2$/g) | Linear shrinkage (%) |
| --- | --- | --- | --- | --- | --- |
| Example 4 | MDA | 0.16 | 25.2 | 128 | 20 |
| Example 5 | PDA | 0.09 | 20.64 | 72 | 10 |
| Example 6 | ODA | 0.14 | 24.67 | 153 | 20 |
| Example 7 | XDA | 0.10 | 13.76 | 226 | 10 |
| Example 8 | BAPB | 0.09 | 18.12 | 131 | 7 |

Referring to Table 2, the representative aerogels according to Examples 4 to 8 have an average pore size ranging from about 1 nm to 50 nm. In addition, they have excellent specific surface areas, thermal conductivity, and linear shrinkage characteristics.

In addition, the aerogel of Example 4 has thermal conductivity of 21.0 mW/m·K at 20° C., as determined using a heat flow meter (HFM 436/3/1 Lambda) made by Netzche-Gerätebau GmbH according to the ASTM C518 standard.

Figure 4:
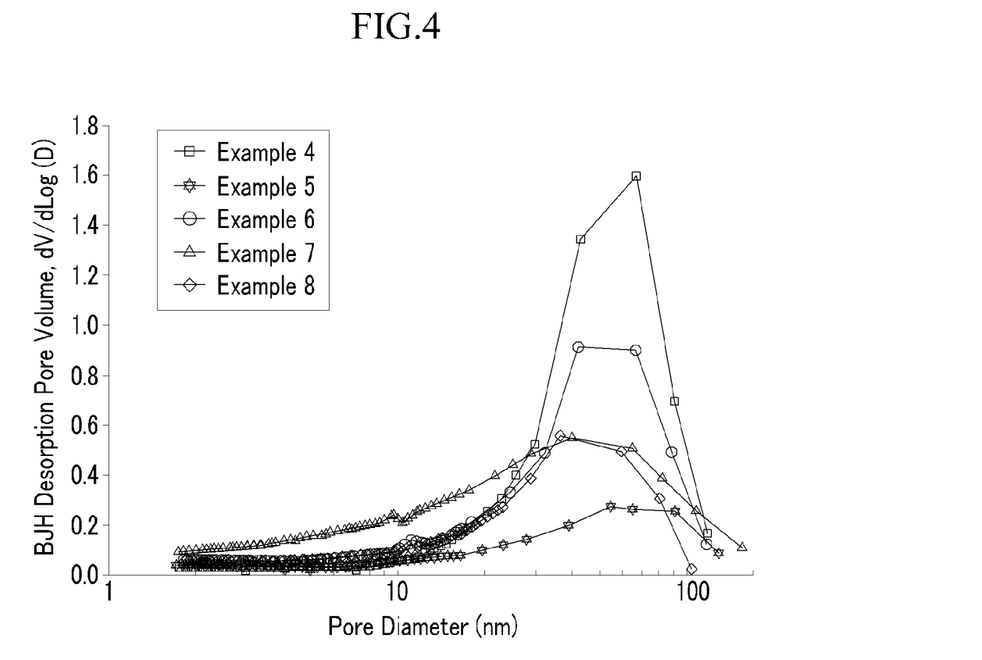
FIG. 4 is a graph of BJH desorption pore volume (dV/dLog (D)) vs pore diameter (nm), showing the pore size distribution of representative aerogels according to Examples 4 to 8.

FIG. 4 provides a graph showing the pore size distribution determined for the representative aerogels according to Examples 4 to 8. Referring to FIG. 4, the aerogels according to Examples 4 to 8 exhibit pores with a highly uniform size, which are not destroyed but rather are maintained during the solvent exchange and drying steps.

Figure 5:
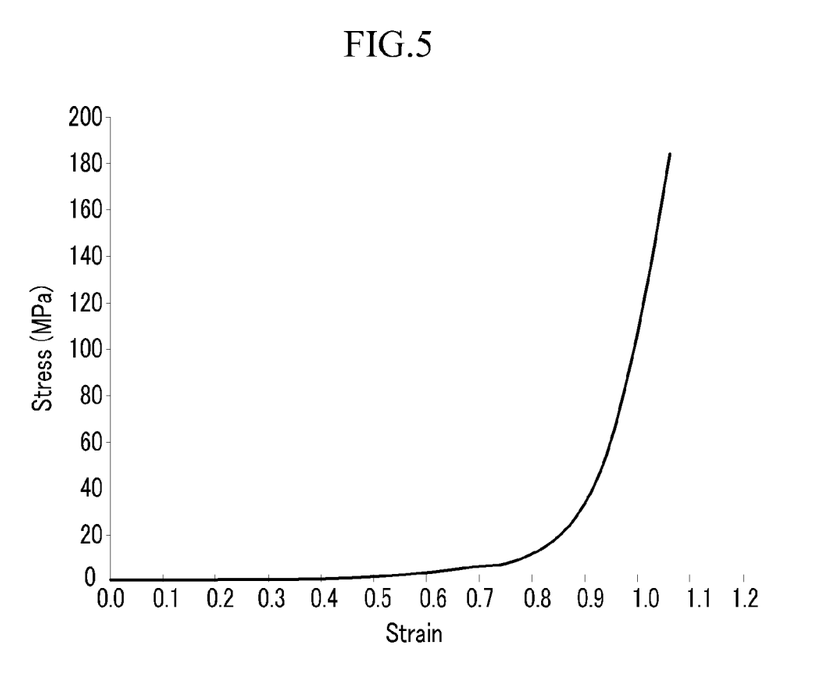
FIG. 5 is a graph of stress (MPa) vs strain (%) for a representative aerogel according to Example 4.

FIG. 5 provides graph showing the stress-strain curve of the representative aerogel according to Example 4. The aerogel specimen is tested for compressive strength according to the ASTM D695-02a standard using a universal testing machine (WL2100). The specimen is fixed to have a diameter of about 10 mm and a length of about 12.5 mm and measured using a 30000N load cell under a crosshead speed of 3.15 mm/min. The representative aerogel of Example 4 displays a high average compressive strength of about 180.30 MPa, and the average transformation rate is determined to be about 94.09%. These compressive strength and transformation rate values are determined by calculating the average of results for ten specimens.

While this disclosure has been described in connection with what is presently considered to be practical exemplary embodiments, it is to be understood that the invention is not limited to the disclosed embodiments, but, on the contrary, is intended to include various modifications and equivalent arrangements included within the spirit and scope of the appended claims.

What is claimed is:

1. An aerogel comprising a benzoxazine moiety-containing polybenzoxazine polymer, wherein the polymer comprises a reaction product of an aryl alcohol compound having at least two hydroxyl groups and an amine compound having at least two amine groups.

2. The aerogel of claim 1, wherein the aryl alcohol compound having at least two hydroxyl groups is represented by the following Chemical Formula 1:

Chemical Formula 1 wherein, in the above Chemical Formula 1, each $Ar_1$ and $Ar_2$ is independently a substituted or unsubstituted C6 to C30 aryl group, a substituted or unsubstituted C3 to C30 heteroaryl group, or a substituted or unsubstituted C7 to C30 alkylaryl group, such that each $Ar_1$ and $Ar_2$ comprises at least one unsubstituted ring carbon at the alpha position with respect to a hydroxyl group, each $L_1$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, each R and R' is independently hydrogen or a substituted or unsubstituted C1 to C10 alkyl group, r is an integer ranging from 0 to 4, n and m are independently an integer ranging from 1 to 5, and n+m is determined by the valence of $L_1$, p and q are independently an integer ranging from 1 to 4, and p+q is 2 or more provided that when $k_1$ is 0, p is 2, 3 or 4, and $k_1$ is an integer ranging from 0 to 4.

3. The aerogel of claim 1, wherein the aryl alcohol compound having at least two hydroxyl groups is represented by the following Chemical Formula 2:

Chemical Formula 2 wherein, in the above Chemical Formula 2, each $L_1$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, each $R_1$ and $R_2$ is independently hydrogen, a hydroxyl group, a substituted or unsubstituted C1 to C10 alkyl group, a substituted or unsubstituted C1 to C10 alkoxy group, $NR_xR_y$, OR, $NH(CO)R_x$, $OCOR_x$, a substituted or unsubstituted C6 to C18 aryl group, $CH=CR_x$, or a combination thereof, wherein each $R_x$ and $R_y$ is independently hydrogen or a substituted or unsubstituted C1 to C10 alkyl group, p and q are independently integers ranging from 1 to 4, p+q is 2 or more, provided that when $k_1$ is 0, p is 2, 3 or 4, a and b are independently integers ranging from 1 to 3, and $k_1$ is an integer ranging from 0 to 4, such that at least one unsubstituted carbon is present at an alpha position with respect to a hydroxyl group in each of the benzene rings of Chemical Formula 2.

4. The aerogel of claim 3, wherein each $L_1$ is a linker represented by the following Chemical Formula 3:

Chemical Formula 3 wherein, in the above Chemical Formula 3, $R_3$ and $R_4$ are independently a substituted or unsubstituted C1 to C10 alkyl group, a substituted or unsubstituted C1 to C10 alkoxy group, a substituted or unsubstituted C3 to C20 cycloalkyl group, or a substituted or unsubstituted C6 to C18 aryl group.

5. The aerogel of claim 3, wherein at least one of $R_1$ and $R_2$ in the above Chemical Formula 2 is a substituted or unsubstituted C1 to C10 alkyl group, a substituted or unsubstituted C1 to C10 alkoxy group, $NR_xR_y$, $OR_x$, $NH(CO)R_x$, $OCOR_x$, a substituted or unsubstituted C6 to C18 aryl group, or $CH=CR_x$, wherein each $R_x$ and $R_y$ is independently hydrogen or a substituted or unsubstituted C1 to C10 alkyl group.

6. The aerogel of claim 1, wherein the amine compound comprising at least two amine groups is represented by the following Chemical Formula 4:

Chemical Formula 4 wherein, in the above Chemical Formula 4, each $Z_1$ and $Z_2$ is independently a substituted or unsubstituted C6 to C30 aryl group, a substituted or unsubstituted C3 to C30 heteroaryl group, a substituted or unsubstituted C7 to C30 alkylaryl group, or $NR_z$, wherein, $R_z$ is hydrogen, a C1 to C20 alkyl group, or a C1 to C20 an alkyl group having an amine substituent or a C6 to C30 aryl), each $L_2$ is independently a single bond, O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, n and m are independently integers ranging from 1 to 5, and n+m is determined by the valence of $L_2$, p and q are independently integers ranging from 1 to 4, each R, R', R", and R'" is independently hydrogen or a C1 to C10 alkyl group, r1 and r2 are independently integers ranging from 0 to 4, and $k_2$ is an integer ranging from 0 to 4.

7. The aerogel of claim 1, wherein the amount of the amine compound comprising at least two amine groups ranges from about 1 mole to about 1.5 moles per mole of the aryl alcohol compound.

8. The aerogel of claim 1, which has a pore size ranging from about 1 nm to 50 nm.

9. The aerogel of claim 8, wherein the aerogel has a porosity ranging from about 80 percent to about 99 percent based on the total volume of the aerogel.

10. The aerogel of claim 1, which has a specific surface area ranging from about 100 $m^2/g$ to about 800 $m^2/g$.

11. The aerogel of claim 1, which has compressive strength ranging from about 0.1 MPa to 300 MPa.

\* \* \* \* \*